Patented Sept. 25, 1923.

1,468,806

UNITED STATES PATENT OFFICE.

WILLIAM E. GREENAWALT, OF DENVER, COLORADO.

METALLURGICAL PROCESS.

No Drawing.     Application filed July 19, 1921.  Serial No. 485,885.

*To all whom it may concern:*

Be it known that I, WILLIAM E. GREENAWALT, a citizen of the United States, residing in the city and county of Denver and State of Colorado, have invented certain new and useful Improvements in Metallurgical Processes, of which the following is a specification.

The process is more particularly directed to the treatment of ores, especially copper ores, by roasting and leaching to extract the metal values. It will be described as applied to the treatment of copper ores and concentrate.

In the treatment of copper concentrate by roasting and leaching a serious difficulty has been to get high extractions of the copper. This is largely due to the more or less insoluble compounds formed during the roasting of sulphide concentrate, such as ferrites, and these insoluble compounds are more likely to be formed when the roasting temperature is high.

The amount of water soluble copper is largely dependent also on the amount of soluble iron formed in the various stages of the roasting. If, for example, a pyritic copper concentrate is subjected to the ordinary careful oxidizing or sulphatizing roast, some copper and some iron is made soluble in the early stages of the roasting. As the roasting progresses, more iron and more copper become soluble up to a certain point, when the soluble iron reaches a maximum. After this point, with care in roasting, much of the sulphuric acid combined with the soluble iron can be transferred to the copper, so that the amount of water soluble copper can be correspondingly increased, while the soluble iron is converted into the oxide and becomes insoluble. In this way a considerable portion of the copper can be made soluble in water and a good extraction can be made with dilute acid.

I have found that this process can be greatly improved by adding small amounts of the raw concentrate from time to time after the roasting has progressed far enough to decompose the soluble iron in the original charge. When a small amount of the raw sulphide concentrate is added from time to time to the partly roasted material, soluble iron is again formed from the fresh concentrate, and as this is decomposed more copper is made soluble in water. Practice will determine the amount and the time of adding the raw concentrate. Usually two or three additions, totaling five per cent of the original charge, will be sufficient. The sulphur dioxide, released by the addition of the raw concentrate to the original charge, also has a beneficial effect, but it is believed that the amount of water soluble copper is mostly due to the decomposition of the soluble iron. If only small amounts of raw sulphide is added there does not appear to be any evolution of sulphur dioxide from the hot ore. The temperature should be kept quite low; preferably between 400 and 600 degrees C. 500 degrees C. will be found a good working temperature. Steam appears to promote the reaction and has a beneficial effect.

It is quite easy, in this way, to greatly improve an inferior roast. For example, a pyritic copper sulphide concentrate, was roasted with inferior results, as follows;

Per cent.
Head, roasted concentrate, copper____ 13.60
Water soluble copper_____  3.38
Acid soluble copper_____ 10.40
Percentage water soluble copper_____ 25.00
Percentage acid soluble copper_____ 77.10

This roasted and unbleached concentrate was again heated for about 1½ hours with two additions of a small quantity of the raw concentrate, and in the presence of a small amount of steam. The original roasted concentrate, which was dark in color, was converted into the well known red, indicative of a good roast. The results after this treatment were as follows;

Per cent.
Water soluble copper_____  9.56
Acid soluble copper_____ 12.80
Percentage water soluble copper_____ 70.30
Percentage acid soluble copper_____ 93.97

With care in the roasting and leaching it has been found that the ultimate extraction can, in this way, be maintained between 95 and 98 per cent.

Rather interesting results are obtained by roasting the high tailings from a leached charge. A portion of the original roasted concentrate was leached, and given only a very slight washing. The tailing assayed 3.68% copper. This residue was re-roasted, as above described, with results as follows;

|   | Per cent. |
|---|---|
| Head, roasted residue, copper | 3.68 |
| Water soluble copper | 3.28 |
| Acid soluble copper | 3.34 |
| Percentage soluble in water | 89.1 |
| Percentage soluble in dilute acid | 90.8 |
| Percentage acid soluble based on original ore | 97.3 |

In the re-treatment of leach tails, it is not necessary, nor is it desirable, to give the tailings a thorough washing. The acid and salts in the residue promote the desired reaction in the re-roasting. In order to still further promote the reaction, I prefer to wash the acid leach residues with the barren foul solution obtained from previous leachings. The barren foul solutions always contain an abundance of iron salts, and frequently considerable free acid, all of which are highly beneficial in the re-roasting.

It frequently happens that a larger portion of the copper in the leach residues is concentrated or contained in the more or less insoluble compounds, such as the ferrites, or magnetic iron. If the ore is roasted at a high temperature in the ordinary way, much of the copper becomes insoluble and most of the iron becomes magnetic, as is well known. In order to avoid the re-roasting of all the leach residues high in copper, the leach tailings are concentrated, where possible, to get the major portion of the copper into a comparatively small portion of the residue. This leach concentrate is then subjected to the process described, and the concentration tailings may then be wasted; their copper content will be very low. The concentration of the leach tailings may be done either by a gravity process, or by magnetic separation, as is well known.

In adding a pyritic ore to the leach residue, it is advisable to use a pyritic ore of about the same copper content as the residue. It would not be advisable to add a raw copper concentrate containing say, 15% copper to a residue assaying 3.5% copper. Nor would it be advisable, where a suitable pyritic copper bearing ore is obtainable, to add a pyritic ore containing no copper, since this would involve an extra expense. If, however, a pyritic ore of about the same copper content as the residue is added, the extraction of the copper can be made almost complete, and the small amount of copper in the pyritic ore added to the charge will cover its own expense.

When the finely divided pyritic ore is added to the partly roasted charge and is thoroughly incorporated with it, both the soluble iron and the liberated sulphur gas are effectively applied to the partly roasted material to convert the copper oxides into the sulphate. Heat is temporarily generated on every addition to the partly roasted charge and the mass can easily be maintained at incandescence after the sulphur in the original charge is driven off. The small amount of combustible added, will not, however, generate sufficient heat to maintain the mass at the temperature desired. Some external firing will be necessary, or at least desirable. Carbonaceous fuel may also be added to the partly roasted charge with the pyritic ore, to advantage, in some cases.

The pyritic ore which is added in small quantities to the partly roasted charge is quickly oxidized. It is known, for example, that finely ground pyritic ore when subjected to heat in a highly oxidizing atmosphere, can be oxidized in less than a minute. In the present case, the finely ground pyritic ore, is not surrounded by similar ore in the first stages of roasting, but by hot oxidized ore, so that the atmosphere in the mass of the hot charge is highly oxidizing and not reducing.

In practice, when roasting on a large scale, it is preferred to continuously feed small streams of finely ground pyritic ore into the main partly roasted stream, at different points of the furnace. The rabbles will thoroughly mix the raw ore with the partly roasted material and in this way both the iron sulphates and the released sulphur dioxide are most effectively applied to sulphatize the copper, while the raw pyritic ore is itself quickly and completely oxidized. The number of points at which the finely ground pyritic ore is added in a continuous stream to the main partly roasted stream, their position, and the amount of pyritic ore added in each stream, can best be determined by a little experimenting, and will vary somewhat with the material being roasted and the results desired. Ordinarily an amount ranging from five to ten per cent of the original charge will be found to give good results. If the copper content of the original charge is small, less than five per cent will give good results. In adding the pyritic ore to the main stream of material going through the furnace, the idea would be to add it in such a way that the previous addition would be oxidized before a subsequent addition is made.

In the operation of this process considerable importance is attached to the iron oxide acting as a catalytic agent, in the latter stages of the roasting. It is well known that iron oxide is a fairly good catalytic agent in converting sulphur dioxide into sulphur trioxide or sulphuric acid, and, in the latter stages of the roasting, when there is an abundance of iron oxide, the conditions are excellent for a good sulphatization of the copper, brought about by the nascent sulphur dioxide liberated in contact with the hot iron oxide. It is very probable that ferric sulphate is also formed in this catalytic process, which acts, as already indicated, to sulphatize the copper.

The process is eminently adapted to the treatment of mixed copper ores: that is to say, copper ores in which part of the copper occurs as the oxide or carbonate and part as the sulphide. It is possible by this process, by adding finely ground pyritic material after the ore has reached a roasting temperature, to get so high a percentage of the copper soluble in water, that acid leaching may not be necessary or profitable. In mixed or oxidized low grade copper ores adding relatively small amounts of finely ground pyritic material to the main stream of ore as it passes through the furnace, at a number of points, is particularly effective. The process is also applicable to low grade oxidized copper ores, if roasting and water leaching is cheaper than acid leaching of the unroasted ore.

It is evident that reacting materials, other than finely ground pyrites, may be used in the same way. If, for example, it is desired to chloridize the ore, finely ground salt may be added and mixed with the finely ground pyrites, and the ore treated with the mixture as described for pyrites alone.

I claim:

1. A process of treating pyritic copper ore or concentrate which consists in roasting the material until the larger portion of the sulphur is eliminated and most of the iron converted into the oxide, then adding small quantities of pyritic ore to the hot partly roasted material and completing the roasting, and leaching the copper from the roasted material.

2. A process of treating pyritic copper ore or concentrate which consists in roasting the material until the larger portion of the sulphur is eliminated and most of the iron converted into the oxide, then adding small quantities of pyritic ore to the hot partly roasted material and completing the roasting in the presence of steam, and leaching the copper from the roasted material.

3. A process of treating pyritic copper ore or concentrate which consists in roasting the material until the larger portion of the sulphur is eliminated and most of the iron converted into the oxide, then adding small quantities of pyritic ore from time to time and completing the roasting in the presence of steam, and leaching the copper from the roasted material.

4. A process of treating pyritic copper ore or concentrate which consists in roasting the material until the larger portion of the sulphur is eliminated and most of the iron converted into the oxide, then applying sulphur dioxide and steam and completing the roasting, and leaching the copper from the roasted material.

5. A process of treating pyritic copper ore or concentrate which consists in roasting the material, leaching the roasted material to extract a portion of the copper, mixing the leach residue with a small quantity of pyritic ore, heating the mixture, and again leaching the material to extract the remainder of the copper.

6. A process of treating pyritic copper ore or concentrate which consists in roasting the material, leaching the roasted material to extract a portion of the copper, concentrating the leach residue, mixing the leach residue concentrate with a pyritic ore, heating the mixture, and again leaching the material to extract the remainder of the copper.

7. A process of treating pyritic copper ore or concentrate which consists in roasting the material, leaching the roasted material to extract the major portion of the copper, mixing a low grade pyritic copper ore with the leach residue, roasting the mixture, and leaching the roasted mixture to extract the minor portion of the copper.

8. A process of treating pyritic copper ore or concentrate which consists in roasting the material, leaching the roasted material to extract a portion of the copper, treating the leach residue with the foul barren solution from previous leachings, mixing the leach residue with a pyritic ore, roasting the mixture, and leaching the roasted mixture to extract the remainder of the copper.

9. A process of treating copper ore or concentrate which consists in roasting the material, leaching the roasted material to extract a portion of the copper, concentrating the copper in the leach residue into a smaller volume, mixing the leach concentrate with a pyritic ore, roasting the mixture, and then leaching the roasted mixture to extract the copper.

10. A process of treating sulphide ore or concentrate which consists in roasting the material until the larger portion of the sulphur is eliminated and the metal of the ore partly oxidized or sulphatized, then adding small quantities of the raw material to the partly roasted charge and completing the roasting in the presence of steam, and leaching the metal from the roasted material.

11. A process of treating pyritic copper ore or concentrate which consists in roasting the material until the major portion of the sulphur is eliminated and the iron mostly converted into the oxide, then continuously feeding a relatively small portion of finely ground pyritic ore into the main stream of partly roasted material and completing the roasting, and leaching the roasted material to extract the copper.

12. A process of treating copper ores or concentrate which consists in partly roasting the material, then adding relatively small portions of finely ground pyritic ore in continuous streams to the main stream of partly roasted material at different points of the roasting furnace, completing the roasting, and leaching the roasted material to extract the copper.

13. A process of treating sulphide ore or concentrate, which consists in partly roasting the material, then continuously feeding a relatively small portion of finely ground sulphide ore to the main stream of partly roasted material, and then completing the roasting, and leaching the roasted material to extract the contained metals.

14. A process of treating sulphide ore or concentrate which consists in partly roasting the material, then continuously feeding relative small portions of finely ground sulphide ore to the main stream of partly roasted ore in its passage through the furnace at different points of the furnace, completing the roasting, and leaching the roasted material to extract the metals therefrom.

15. A metallurgical process comprising, passing a stream of ore through a roasting furnace, adding relatively small quantities of pyritic material to the ore stream after the ore has attained a roasting temperature, and leaching the roasted ore to extract the metals therefrom.

16. A metallurgical process comprising, passing a stream of ore through a roasting furnace, introducing steam into the furnace, adding relatively small quantities of pyritic material to the ore stream after the ore has attained a roasting temperature, and leaching the roasted ore to extract the metals therefrom.

17. A metallurgical process comprising, passing a stream of ore through a roasting furnace, adding relatively small quantities of pyritic material to the ore stream at different points after the ore has attained a roasting temperature, and leaching the roasted ore to extract the metals therefrom.

18. A metallurgical process comprising, passing a stream of ore through a roasting furnace, introducing steam into the furnace, adding relatively small quantities of sulphur containing material to the ore stream at different points after the ore has attained a roasting temperature, and then leaching the roasted ore to extract the metals therefrom.

19. A metallurgical process comprising, passing ore through a roasting furnace in a main continuous stream and after the ore has attained a roasting temperature adding finely ground pyritic material in a continuous stream to the main stream, and leaching the roasted ore to extract the metals therefrom.

20. A metallurgical process comprising, passing ore through a roasting furnace in a main continuous stream and after the ore has attained a roasting temperature adding finely ground pyritic material in relatively small amounts and in continuous streams to the main stream of ore at different points as the ore is advanced through the furnace, and recovering the metal values from the resulting chemical compounds so formed.

21. A metallurgical process comprising, passing ore through a roasting furnace in a main continuous stream and after the ore has attained a roasting temperature adding relatively small amounts of finely ground material to the main ore stream at different points of the furnace, said finely ground material being capable of chemically reacting with the metal constituents of the ore to make them soluble in water.

22. A metallurgical process comprising, passing ore through a roasting furnace in a main continuous stream and after the ore has attained a roasting temperature adding relatively small amounts of finely ground material in continuous streams at different points of the furnace, said finely ground material being capable of chemically reacting with the metal constituents of the ore.

23. A metallurgical process comprising, roasting ores of metals, leaching the roasted ore with foul solution from previous leaching and containing a high percentage of salts of iron, mixing the leach residue with a pyritic material, roasting the mixture, and leaching the roasted mixture to extract the remaining metals therefrom.

WILLIAM E. GREENAWALT.